United States Patent
Peters et al.

(10) Patent No.: US 9,964,203 B2
(45) Date of Patent: May 8, 2018

(54) PASSIVE METHOD OF PREVENTING BALL AXLE MOVEMENT DURING A ROLLBACK EVENT IN A BALL-PLANETARY TYPE CONTINUOUSLY VARIABLE TRANSMISSION

(71) Applicant: Dana Limited, Maumee, OH (US)

(72) Inventors: Sebastian J. Peters, Cedar Park, TX (US); Patrick Sexton, Austin, TX (US)

(73) Assignee: Dana Limited, Maumee, OH (US)

( * ) Notice: Subject to any disclaimer, the term of this patent is extended or adjusted under 35 U.S.C. 154(b) by 0 days. days.

(21) Appl. No.: 15/406,215

(22) Filed: Jan. 13, 2017

(65) Prior Publication Data
US 2017/0204963 A1    Jul. 20, 2017

Related U.S. Application Data (60) Provisional application No. 62/279,207, filed on Jan. 15, 2016.

(51) Int. Cl.
*F16H 57/08* (2006.01)
*F16H 15/52* (2006.01)

(52) U.S. Cl.
CPC ........... *F16H 57/082* (2013.01); *F16H 15/52* (2013.01)

(58) Field of Classification Search
CPC ........ F16H 57/082; F16H 15/52; F16H 37/08; F16H 15/28; F16H 57/04; F16H 63/08
See application file for complete search history.

(56) References Cited

U.S. PATENT DOCUMENTS

| | | | |
|---|---|---|---|
| 4,867,291 A | 9/1989 | Holman et al. | |
| 8,167,759 B2 * | 5/2012 | Pohl | F02B 67/04 180/53.8 |
| 8,360,917 B2 * | 1/2013 | Nichols | B62M 11/16 475/189 |
| 9,347,532 B2 * | 5/2016 | Versteyhe | F16H 15/40 |
| 9,581,225 B2 | 2/2017 | Ogawa | |
| 9,677,650 B2 * | 6/2017 | Nichols | B62M 6/55 |
| 9,683,638 B2 * | 6/2017 | Kolstrup | F16H 15/40 |
| 2009/0132135 A1 | 5/2009 | Quinn, Jr. et al. | |
| 2012/0115667 A1 * | 5/2012 | Lohr | F16H 15/50 475/214 |
| 2013/0256052 A1 | 10/2013 | Kamisetty et al. | |

(Continued)

FOREIGN PATENT DOCUMENTS

WO    2017062607 A1    4/2017

OTHER PUBLICATIONS

Unpublished U.S. patent application titled "Systems and Methods for Controlling Rollback in Continuously Variable Transmissions" (U.S. Appl. No. 14/996,743, filed Jan. 15, 2016).

*Primary Examiner* — David J Hlavka
(74) *Attorney, Agent, or Firm* — Marshall & Melhorn, LLC (57) ABSTRACT

Provided herein is a carrier assembly for a continuously variable transmission having a plurality of balls, each ball having a ball axle, the ball axle defining a tiltable axis of rotation, a first traction ring assembly in contact with each ball, a second traction ring assembly in contact with each ball, the carrier assembly having a first carrier member substantially non-rotatable, a second carrier member configured to rotate relative to the first carrier member, and an axle capture member fixedly coupled to the first carrier member. The axle capture member is configured to selectively couple to one end of each ball axle.

13 Claims, 9 Drawing Sheets

(56) References Cited

U.S. PATENT DOCUMENTS

2013/0261909 A1 10/2013 Kamisetty et al.
2015/0081182 A1 3/2015 Li et al.
2015/0158492 A1 6/2015 Bulgrien et al.

* cited by examiner

Detail A (Underdrive)

Figure 8A

Detail B (Shifting Toward Overdrive)

PASSIVE METHOD OF PREVENTING BALL AXLE MOVEMENT DURING A ROLLBACK EVENT IN A BALL-PLANETARY TYPE CONTINUOUSLY VARIABLE TRANSMISSION

RELATED APPLICATION

This application claims the benefit of U.S. Provisional Application No. 62/279,207 filed on Jan. 15, 2016, which is herein incorporated by reference.

BACKGROUND

Automatic and manual transmissions are commonly used on automobiles. Such transmissions have become more and more complicated since the engine speed has to be adjusted to limit fuel consumption and the emissions of the vehicle. A vehicle having a driveline including a tilting ball variator allows an operator of the vehicle or a control system of the vehicle to vary a drive ratio in a stepless manner. A variator is an element of a Continuously Variable Transmission (CVT) or an Infinitely Variable Transmission (IVT). Transmissions that use a variator can decrease the transmission's gear ratio as engine speed increases. This keeps the engine within its optimal efficiency while gaining ground speed, or trading speed for torque during hill climbing, for example. Efficiency in this case can be fuel efficiency, decreasing fuel consumption and emissions output, or power efficiency, allowing the engine to produce its maximum power over a wide range of speeds. That is, the variator keeps the engine turning at constant RPMs over a wide range of vehicle speeds.

SUMMARY

Provided herein is a carrier assembly for a continuously variable transmission having a plurality of balls, each having a tiltable ball axle, a first traction ring assembly in contact with each ball, a second traction ring assembly in contact with each ball. The carrier assembly includes a first carrier member operably coupled to a first end of each tiltable ball axle and substantially non-rotatable; a second carrier member operably coupled to the first carrier member and to a second end of each tiltable ball axle; and an axle capture member fixedly coupled to the first carrier member. The second carrier member is configured to rotate with respect to the first carrier member and is arranged between the first carrier member and the axle capture member.

Provided herein is an axle capture member for a carrier assembly for a continuously variable transmission having a plurality of balls, each ball having a tiltable axis of rotation, a first traction ring assembly in contact with each ball, and a second traction ring assembly in contact with each ball. The axle capture member includes a body having a central bore; a first plurality of hooks extending radially outward from the central bore; and a plurality of extensions extending radially outward from the central bore. Each extension has a bend between the central bore and a distal end of the extension.

Provided herein is a method of controlling a position of a ball axle provided in a continuously variable transmission having a plurality of balls, each ball having a tiltable axis of rotation, a first traction ring assembly in contact with each ball, and a second traction ring assembly in contact with each ball. The method includes providing a first carrier member to support a first end of each ball axle; providing a second carrier member to support a second end of each ball axle; and providing an axle capture member to selectively couple to the second end of each ball axle.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the preferred embodiments are set forth with particularity in the appended claims. A better understanding of the features and advantages of the present embodiments will be obtained by reference to the following detailed description that sets forth illustrative embodiments, in which the principles of the embodiments are utilized, and the accompanying drawings of which:

DETAILED DESCRIPTION OF THE PREFERRED EMBODIMENTS

The preferred embodiments relate to components that can be used in a ball planetary style continuously variable transmission, such as the Variglide®, in order to provide lubrication and cooling to internal components of the transmission.

The preferred embodiments will now be described with reference to the accompanying figures, wherein like numerals refer to like elements throughout. The terminology used in the descriptions below is not to be interpreted in any limited or restrictive manner simply because it is used in conjunction with detailed descriptions of certain specific embodiments. Furthermore, preferred embodiments can include several novel features, no single one of which is solely responsible for its desirable attributes or which is essential to practicing the embodiments described.

Figure 1:
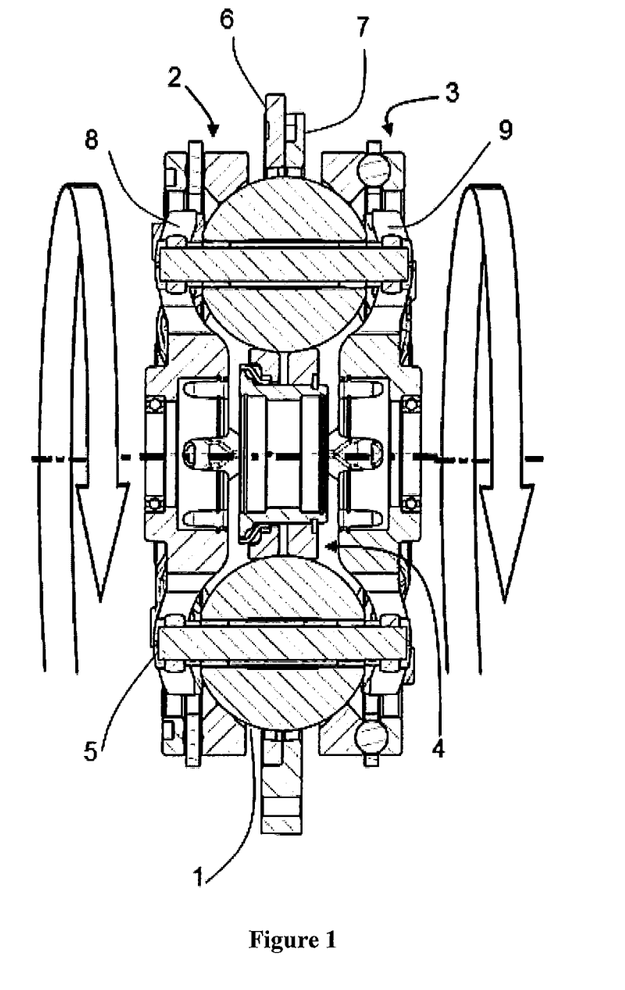
FIG. 1 is a side sectional view of a ball-type variator.
Figure 2:
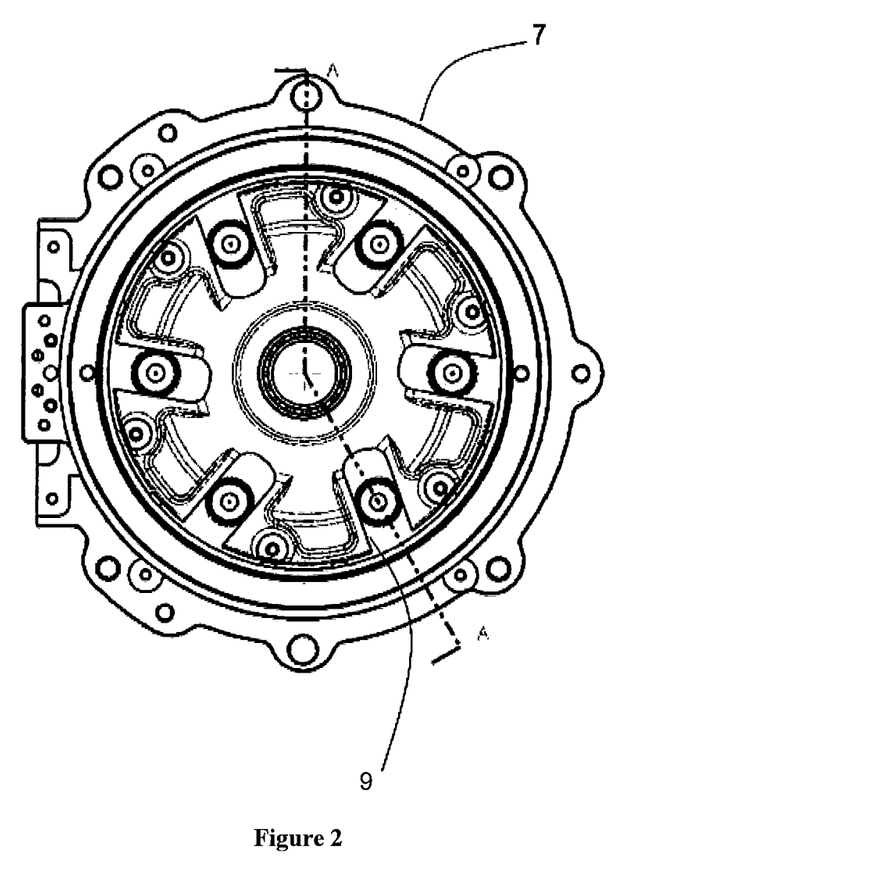
FIG. 2 is a plan view of a carrier member that can be used in the variator of FIG. 1.

Provided herein are configurations of CVTs based on a ball type variators, also known as CVP, for continuously variable planetary. Basic concepts of a ball type Continuously Variable Transmissions are described in U.S. Pat. No. 8,469,856 and U.S. Pat. No. 8,870,711 incorporated herein by reference in their entirety. Such a CVT, adapted herein as described throughout this specification, includes a number of balls (planets, spheres) 1, depending on the application, two ring (disc) assemblies with a conical surface contact with the balls, as input 2 and output 3, and an idler (sun) assembly 4 as shown on FIG. 1. The balls are mounted on tiltable axles 5, themselves held in a carrier (stator, cage)

assembly having a first carrier member 6 operably coupled to a second carrier member 7. The first carrier member 6 can rotate with respect to the second carrier member 7, and vice versa. In some embodiments, the first carrier member 6 can be substantially fixed from rotation while the second carrier member 7 is configured to rotate with respect to the first carrier member, and vice versa. In one embodiment, the first carrier member 6 can be provided with a number of radial guide slots 8. The second carrier member 7 can be provided with a number of radially offset guide slots 9. The radial guide slots 8 and the radially offset guide slots 9 are adapted to guide the tiltable axles 5. The axles 5 can be adjusted to achieve a desired ratio of input speed to output speed during operation of the CVT. In some embodiments, adjustment of the axles 5 involves control of the position of the first and second carrier members to impart a tilting of the axles 5 and thereby adjusts the speed ratio of the variator. Other types of ball CVTs also exist, like the one produced by Milner, but are slightly different.

Figure 3:
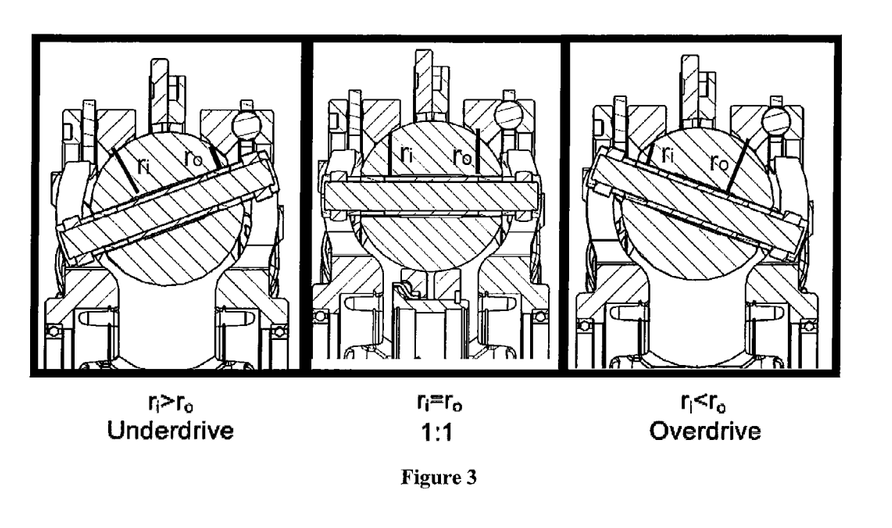
FIG. 3 is an illustrative view of different tilt positions of the ball-type variator of FIG. 1.

The working principle of such a CVP of FIG. 1 is shown on FIG. 3. The CVP itself works with a traction fluid. The lubricant between the ball and the conical rings acts as a solid at high pressure, transferring the power from the input ring, through the balls, to the output ring. By tilting the balls' axes, the ratio can be changed between input and output. When the axis is horizontal the ratio is one, illustrated in FIG. 3, when the axis is tilted the distance between the axis and the contact point change, modifying the overall ratio. All the balls' axes are tilted at the same time with a mechanism included in the carrier and/or idler.

Embodiments disclosed here are related to the control of a variator and/or a CVT using generally spherical planets each having a tiltable axis of rotation that can be adjusted to achieve a desired ratio of input speed to output speed during operation. In some embodiments, adjustment of said axis of rotation involves angular misalignment of the planet axis in a first plane in order to achieve an angular adjustment of the planet axis in a second plane that is substantially perpendicular to the first plane, thereby adjusting the speed ratio of the variator. The angular misalignment in the first plane is referred to here as "skew", "skew angle", and/or "skew condition". In one embodiment, a control system coordinates the use of a skew angle to generate forces between certain contacting components in the variator that will tilt the planet axis of rotation. The tilting of the planet axis of rotation adjusts the speed ratio of the variator. It should be noted that a skew shifted CVT having radially offset guide slots 9, for example, has an inherent characteristic that when rotated in opposite direction of design intent, the slot angle feedback mechanism becomes positive and will drive planet axles towards full OD and lock the unit. Therefore, it is desirable to implement a method of control to prevent lock up in the CVP during operation.

For description purposes, the term "radial" is used here to indicate a direction or position that is perpendicular relative to a longitudinal axis of a transmission or variator. The term "axial" as used here refers to a direction or position along an axis that is parallel to a main or longitudinal axis of a transmission or variator. For clarity and conciseness, at times similar components labeled similarly (for example, bearing 1011A and bearing 1011B) will be referred to collectively by a single label (for example, bearing 1011).

As used here, the terms "operationally connected," "operationally coupled", "operationally linked", "operably connected", "operably coupled," "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be readily apparent to a person of ordinary skill in the relevant technology.

It should be noted that reference herein to "traction" does not exclude applications where the dominant or exclusive mode of power transfer is through "friction." Without attempting to establish a categorical difference between traction and friction drives here, generally these may be understood as different regimes of power transfer. Traction drives usually involve the transfer of power between two elements by shear forces in a thin fluid layer trapped between the elements. The fluids used in these applications usually exhibit traction coefficients greater than conventional mineral oils. The traction coefficient ($\mu$) represents the maximum available traction force which would be available at the interfaces of the contacting components and is the ratio of the maximum available drive torque per contact force. Typically, friction drives generally relate to transferring power between two elements by frictional forces between the elements. For the purposes of this disclosure, it should be understood that the CVTs described here may operate in both tractive and frictional applications. For example, in the embodiment where a CVT is used for a bicycle application, the CVT can operate at times as a friction drive and at other times as a traction drive, depending on the torque and speed conditions present during operation.

Figure 4:
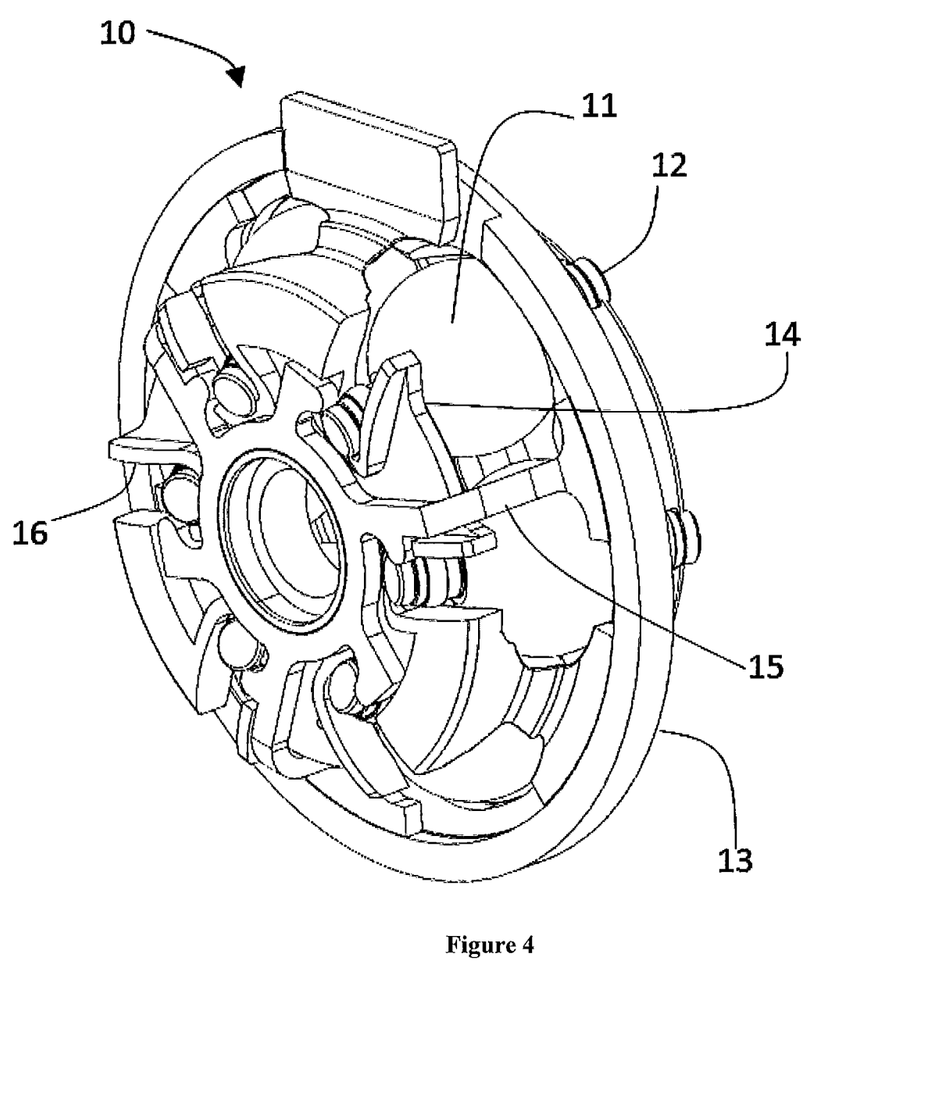
FIG. 4 is a perspective view of certain components of a ball-type variator.
Figure 5:
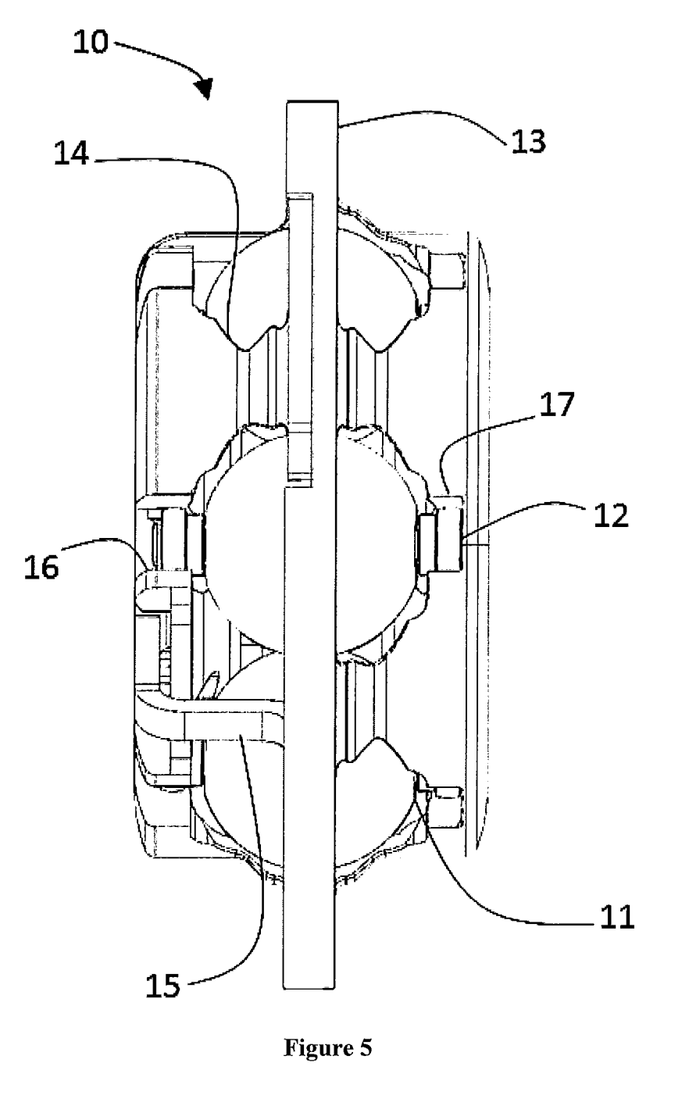
FIG. 5 is a plan view of the ball-type variator depicted in FIG. 4.

Referring now to FIGS. 4 and 5, in one embodiment a continuously variable planetary (CVP) 10 can include a plurality of balls 11, each ball having a tiltable axis of rotation, each ball 11 in contact with a first traction ring, a second traction ring, and an idler assembly (for clarity, the first traction ring, the second traction ring, and the idler assembly are not shown in FIG. 4). Each ball 11 is provided with a ball axle 12 that forms a tiltable axis of rotation. Each ball axle 12 is supported in a carrier assembly that includes a first carrier member 13, a second carrier member 14, and an axle capture member 15. In one embodiment, the first carrier member 13 is a grounded member and substantially non-rotatable. In one embodiment, the second carrier member 14 is adapted to rotate relative to the first carrier member 13 to thereby facilitate a change in speed ratio of the CVP 10. In one embodiment, the axle capture member 15 is fixedly coupled to the first carrier member 13. In one embodiment, the axle capture member 15 substantially surrounds the second carrier member 14. The second carrier member 14 is provided with a number of guide slots 16. The guide slots 16 are configured to guide an end of the ball axles 12. The first carrier member 13 is provided with a number of guide slots 17. The guide slots 17 are configured to guide another end of the ball axles 12.

Figure 6:
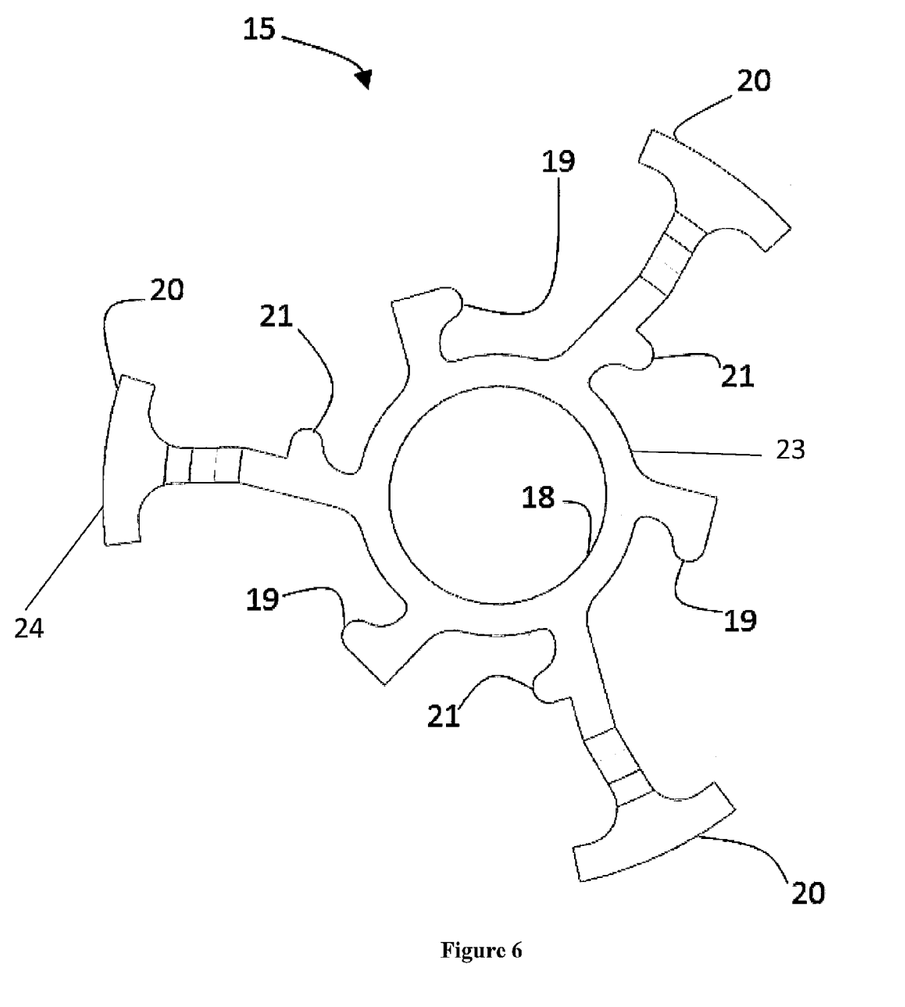
FIG. 6 is a plan view of an axle capture member depicted in FIG. 4.
Figure 7:
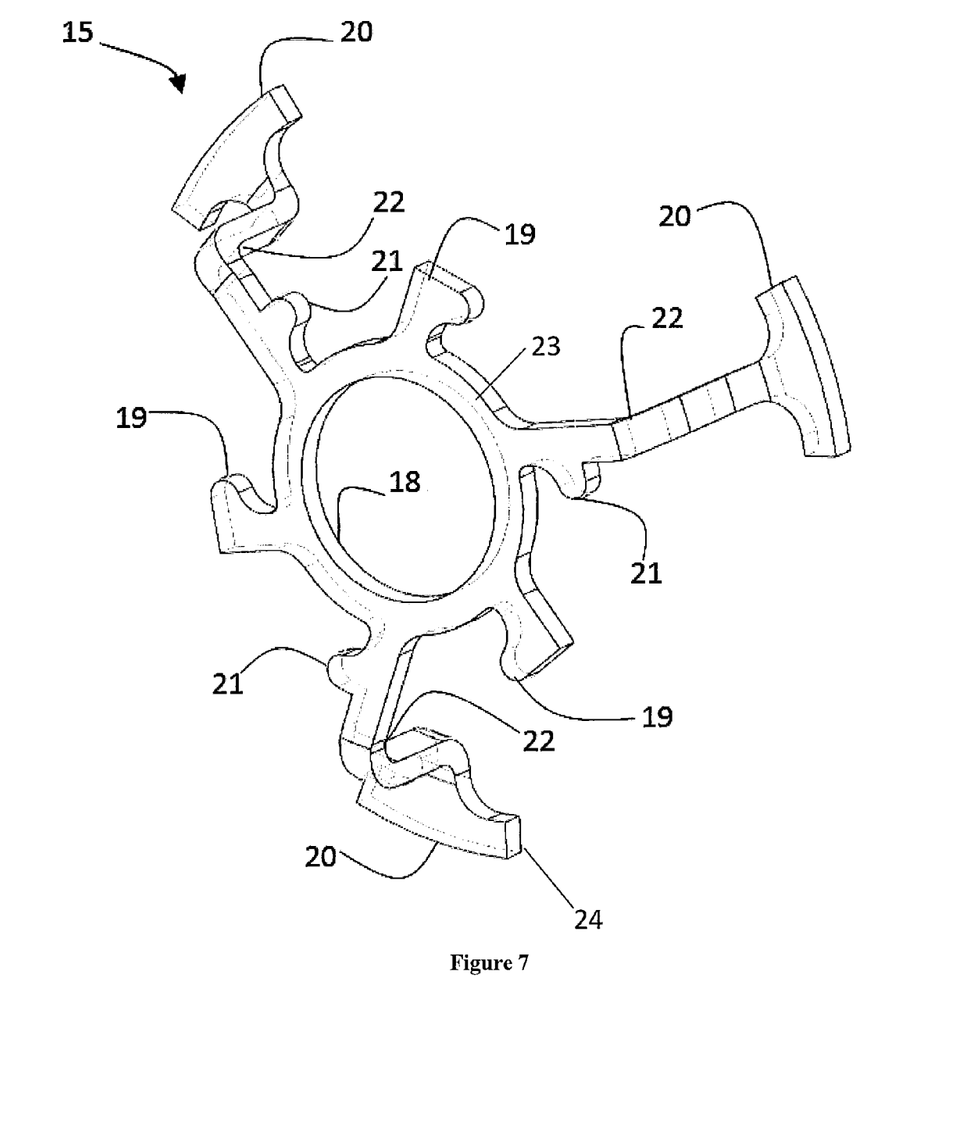
FIG. 7 is a perspective view of the axle capture member of FIG. 6.

Turning now to FIGS. 6 and 7, in one embodiment the axle capture member 15 is provided with a body 23 having a central bore 18. The central bore 18 is substantially aligned with a longitudinal axis of the CVP 10 and facilitates the passage of a main transmission shaft (not shown) through the CVP 10. The axle capture member 15 includes a number of hooks 19 arrayed about the central bore 18. Each hook 19 extends radially outward from the central bore 18. In one embodiment, the axle capture member 15 is provided with a number of extensions 20 arrayed about the central bore. Each extension 20 extends radially outward from the central bore 18. Each extension 20 is provided with a hook 21 that is integral with the extension. It should be appreciated that the hooks 19 and hooks 21 are substantially similar and can be referred to collectively as the hooks 19 or the hooks 21. In some embodiments, the hook 21 is positioned in proximity to the central bore 18 between the central bore and the end of the extension 20.

In one embodiment, each extension 20 has a bend 22 and a distal end 24. The bend 22 is located between the hook 21 and the distal end 24 of the extension 20. The bend 22 facilitates the coupling of the axle capture member 15 to the first carrier member 13. The bend 22 is configured to provide clearance between the second carrier member 14 and the axle capture member 15.

In some embodiments, the axle capture member 15 is optionally configured to have extensions 20 for each of the hooks 19 and the hooks 21. It should be appreciated that the axle capture member 15 is depicted as having three extensions 20, and, in other embodiments, having fewer or more extensions 20 are within the designer's choice to accommodate the number of ball axles 12 and dimensions of the second carrier member 14. It should be further appreciated that the shape and size of the hooks 19 and the hooks 21 are configured within a designer's choice to provide sufficient extension into the guide slot 16 to impede the ball axle 12 when in the underdrive operation condition, which is discussed in more detail in reference to FIGS. 8A-8C. In some embodiments, the hooks 19 and the hooks 21 have a curved shape.

Figure 8A:
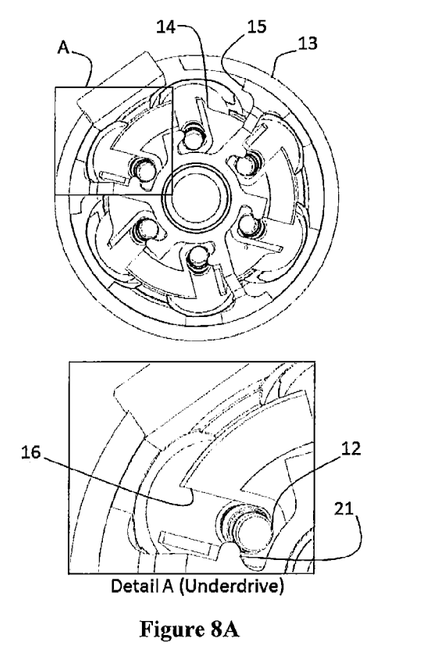
FIGS. 8A-8C are illustrative views of different tilt positions of the ball-type variator depicted in FIG. 4.
Figure 8B:
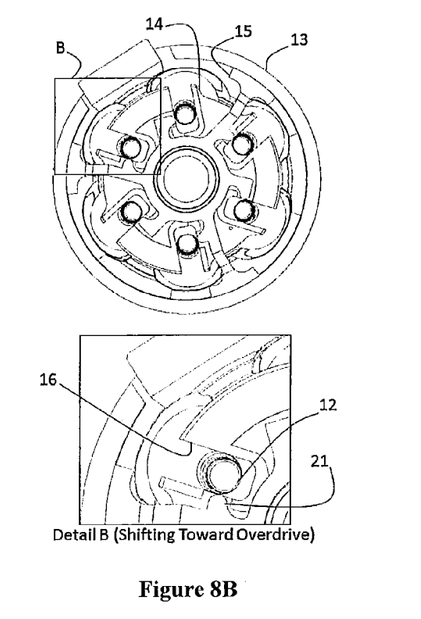
Figure 8C:
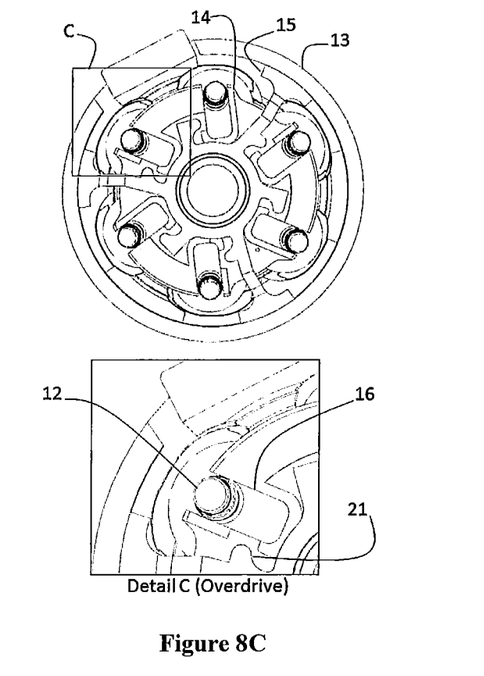

Referring now to FIGS. 8A-8C, during operation of the CVP 10, the ball axle 12 moves radially in the guide slots 16 and the guide slots 17 corresponding to the relative rotation of the second carrier member 14 with respect to the first carrier member 13. The capture member 15 is coupled to first carrier member 13, therefore a relative rotation of the second carrier member 14 with respect to the first carrier member 13 corresponds to a relative rotation of the second carrier member 14 with respect to the capture member 15. For illustrative purposes, three positions of the ball axle 12 are depicted in FIGS. 8A-8C.

FIG. 8A depicts the end of the ball axle 12 in an underdrive operating condition. In the underdrive operating condition, the ball axle 12 is positioned in the guide slot 16 in proximity to the central bore 18. In the underdrive operating condition, the second carrier member 14 positions the ball axle 12 to be in contact with the hook 21. As the CVP 10 is shifted away from underdrive, depicted in FIG. 8B, the second carrier member 14 rotates with respect to the first carrier member 13 and thereby moves the ball axle 12 in the guide slot 16 and away from the hook 21. The rotation of the second carrier member 14 moves the guide slot 16 away from the hook 21. The shifting away from underdrive disconnects the end of the ball axle 12 from the hook 21. FIG. 8C depicts the ball axle 12 in an overdrive condition where the guide slots 16 are positioned by the second carrier member 14 to be out of contact with the capture member 15.

During operation of the CVP 10, the position of the ball axle 12 can be controlled by selectively coupling the axle capture member 15 to the second end of each ball axle 12 during an underdrive operation condition as shown in FIG. 8A. By then selectively decoupling the axle capture member 15 and the second end of each ball axle 12 the CVP 10 can shift from an underdrive operating condition towards an overdrive operation condition as depicted in FIG. 8C.

During operation of the CVP 10, in some embodiments, operating conditions occur that result in a negative or reverse rotation of the transmission output shaft. For example, in some embodiments, a driver will position the vehicle equipped with the CVP on a hill or incline and release the brake pedal. The vehicle will roll backwards down the hill or incline with the transmission engaged thereby turning the transmission output shaft in a reverse direction. For example, in other embodiments, the driver selects a reverse gear on a gear lever, such as a well-known "PRNDL" gear selector. The vehicle will roll backwards in a reverse operating mode and thereby turn the transmission output shaft in a reverse direction. In some embodiments, transmission lock up will occur when the direction of rotation of the CVP components is the reverse of the design direction of rotation. The embodiments described herein prevent lock up of the CVP under reverse rotation operation.

It should be appreciated that a typical one-way clutch or other disconnect device is optionally coupled to the output shaft of the transmission in order to prevent reverse rotation of the CVP. However, there are vehicle applications that prevent implementation of a one-way device.

It should be noted that the description above has provided dimensions for certain components or subassemblies. The mentioned dimensions, or ranges of dimensions, are provided in order to comply as best as possible with certain legal requirements, such as best mode. However, the scope of the embodiments described herein are to be determined solely by the language of the claims, and consequently, none of the mentioned dimensions is to be considered limiting on the inventive embodiments, except in so far as any one claim makes a specified dimension, or range of thereof, a feature of the claim.

While preferred embodiments of the present embodiments have been shown and described herein, it will be obvious to those skilled in the art that such embodiments are provided by way of example only. Numerous variations, changes, and substitutions will now occur to those skilled in the art without departing from the preferred embodiments. It should be understood that various alternatives to the embodiments described herein may be employed in practicing the preferred embodiments. It is intended that the following claims define the scope of the preferred embodiments and that methods and structures within the scope of these claims and their equivalents be covered thereby.

What is claimed is:

1. A carrier assembly for a continuously variable transmission having a plurality of balls, each having a tiltable ball axle, a first traction ring assembly in contact with each ball, and a second traction ring assembly in contact with each ball, the carrier assembly comprising:
    a first carrier member operably coupled to a first end of each tiltable ball axle;
    a second carrier member operably coupled to the first carrier member, the second carrier member operably coupled to a second end of each tiltable ball axle, the second carrier member configured to rotate with respect to the first carrier member; and
    an axle capture member fixedly coupled to the first carrier member,
    wherein the second carrier member is arranged between the first carrier member and the axle capture member.

2. The carrier assembly of claim 1, wherein the axle capture member comprises:
    a body having a central bore;
    a plurality of hooks extending radially outward from the central bore;

a plurality of extensions extending radially outward from the central bore; and wherein each extension has a bend between the central bore and a distal end of the extension.

3. The carrier assembly of claim 2, wherein the first carrier member comprises a plurality of guide slots, each guide slot configured to support the first end of each tiltable ball axle.

4. The carrier assembly of claim 3, wherein the second carrier member comprises a plurality of guide slots, each guide slot configured to support the second end of each tiltable ball axle.

5. The carrier assembly of claim 4, wherein the axle capture member surrounds the second carrier member.

6. The carrier assembly of claim 4, wherein the plurality of hooks contact the second end of the tiltable ball axle when the transmission is operating in an underdrive condition.

7. The carrier assembly of claim 6, wherein the plurality of hooks release the second end of the tiltable ball axle when the tiltable ball axle is shifted towards an overdrive condition.

8. An axle capture member for a carrier assembly for a continuously variable transmission having a plurality of balls, each ball having a tiltable axis of rotation, a first traction ring assembly in contact with each ball, a second traction ring assembly in contact with each ball, the axle capture member comprising:

a body having a central bore;

a plurality of hooks extending radially outward from the central bore;

a plurality of extensions extending radially outward from the central bore; and wherein each extension includes a first hook;

wherein each extension has a bend radially between the first hook and a distal end of the extension.

9. The axle capture member of claim 8, wherein the extension and the first hook are integral.

10. The axle capture member of claim 8, wherein the axle capture member is configured to be non-rotatable.

11. A method of controlling a position of a ball axle provided in a continuously variable transmission having a plurality of balls, each having a tiltable ball axle, a first traction ring assembly in contact with each ball, a second traction ring assembly in contact with each ball, the method comprising:

providing a first carrier member to support a first end of each ball axle;

providing a second carrier member to support a second end of each ball axle;

providing an axle capture member to selectively couple to the second end of each ball axle; and selectively coupling the axle capture member to the second end of the ball axle during an underdrive operating condition.

12. The method of claim 11, further comprising the step of selectively decoupling the axle capture member from the second end of the ball axle during a shift in operating condition from underdrive towards overdrive.

13. The carrier assembly of claim 1, wherein the first carrier member is non-rotatable.

\* \* \* \* \*